United States Patent
Madden

(10) Patent No.: US 7,654,504 B2
(45) Date of Patent: Feb. 2, 2010

(54) POWER ACTUATED VALVE

(75) Inventor: Kenneth M. Madden, Candia, NH (US)

(73) Assignee: Parker & Harper Companies, Inc., Raymond, NH (US)

(*) Notice: Subject to any disclaimer, the term of this patent is extended or adjusted under 35 U.S.C. 154(b) by 321 days.

(21) Appl. No.: 11/704,764

(22) Filed: Feb. 9, 2007

(65) Prior Publication Data

US 2007/0215825 A1 Sep. 20, 2007

Related U.S. Application Data

(60) Provisional application No. 60/771,690, filed on Feb. 9, 2006.

(51) Int. Cl.
*F16K 31/12* (2006.01)
(52) U.S. Cl. .................... 251/129.03; 251/129.11
(58) Field of Classification Search ........... 251/129.01, 251/129.03, 129.11
See application file for complete search history.

(56) References Cited

U.S. PATENT DOCUMENTS

| | | | |
|---|---|---|---|
| 2,550,906 A | 5/1951 | Britton | |
| 4,022,309 A * | 5/1977 | Denkowski et al. | 192/48.5 |
| 4,111,070 A * | 9/1978 | Stratienko | 74/625 |
| 4,429,591 A * | 2/1984 | Zuch et al. | 74/625 |
| 4,647,007 A | 3/1987 | Bajka | |
| 4,759,386 A | 7/1988 | Grouw | |
| 5,131,623 A | 7/1992 | Giordani | |
| 5,477,752 A | 12/1995 | West et al. | |
| 5,588,637 A | 12/1996 | Carsten et al. | |
| 6,003,837 A | 12/1999 | Raymond, Jr. et al. | |
| 6,079,442 A | 6/2000 | Raymond, Jr. et al. | |
| 6,186,471 B1 | 2/2001 | Genga et al. | |
| 6,244,325 B1 * | 6/2001 | Miller et al. | 160/310 |
| 6,371,440 B1 | 4/2002 | Genga et al. | |
| 7,055,795 B2 * | 6/2006 | Lay | 251/129.03 |

\* cited by examiner

*Primary Examiner*—John K Fristoe, Jr.
(74) *Attorney, Agent, or Firm*—Daniels Patent Law PLLC; Scott A. Daniels

(57) ABSTRACT

An improved power actuated valve, particularly a ball valve, which can be manually opened or closed quickly, in the event of failure of power operation, by manual turning force applied directly to the control stem of the valve without the necessity to overcome any drag or negative torque imposed by the power operating mechanism and speed reducing transmission.

12 Claims, 7 Drawing Sheets

POWER ACTUATED VALVE

This application claims priority from Provisional Patent Application No. 60/771,690 filed Feb. 9, 2006.

FIELD OF THE INVENTION

The present invention relates to power actuated valves which generally incorporate an actuator or a motor operating a speed-reducing transmission to turn a flow control member within a valve between an open and closed positions. More specifically, the invention relates to a declutching mechanism for facilitating manual operation of a power actuated valve.

BACKGROUND OF THE INVENTION

Power actuated valves of this general character afford many advantages, particularly in conjunction with remotely control operating systems. Characteristically, such valves are most reliable, nevertheless, operational failures can occur due to power failures or an occasional malfunction of the power driving mechanism or associated controls.

When normal power operation of such a power actuated valve is impossible on account of a power failure or otherwise, it is desirable and even essential that the valve be operated either to start or stop a flow of fluid through the valve. As an emergency procedure, such valves have been operated manually either by turning the driving motor or by turning the output end of the power drive connected with the valve control stem. Neither of these options has been satisfactory and have, on occasion, been ineffective and even a cause of damage to the mechanism.

On account of the wide difference between the rather limited output torque of the driving motor which is practical to use in such valves and the comparatively large torque required to turn the flow control member in the valve, particularly in the case of ball valves, it is highly advantageous to connect the driving motor to the flow control member by means of a transmission having a very high torque multiplying capability and incidentally correspondingly high speed reducing capabilities.

Consequently, the option of manually turning the driving motor or input end of the torque multiplying and speed-reducing transmission is necessarily a slow process because of the many turns required. Moreover, the torque manually applied to the driving motor end of the transmission and being possibly much higher than the maximum torque output of the driving motor is multiplied by the speed-reducing transmission with the consequence that the valve or its operating mechanism can be rather easily damaged by such manual operation.

On the other hand, manually turning the output end of the driving mechanism connected to the valve control shaft can be difficult and ineffective or even impossible as a practical matter. For example, the torsional drag of electrical brushes associated with an electric driving motor can, when multiplied through the speed-reducing transmission, impose a strong negative torque or braking effect resistant to turning of the output end of the drive connected to the valve control stem. As a practical matter, the cumulative drag of this negative torque of the unenergized drive mechanism and the normal turning resistance of the flow control member within the valve can make it unfeasible to manually open or close the valve by torque manually applied to the output end of the actuating mechanism.

SUMMARY OF THE INVENTION

Wherefore, it is an object of the present invention to overcome the above mentioned shortcomings and drawbacks associated with the prior art.

An object of the present invention is to provide an improved power actuated valve, particularly a ball valve, which can be manually opened or closed quickly, in the event of failure of power operation, by manual turning force applied directly to the control stem of the valve without the necessity to overcome any drag or negative torque imposed by the power operating mechanism and speed reducing transmission.

Another object is to provide power actuated valve structure of a compact character which can be operated manually by activating a disengagement or declutching mechanism which disengages the power operating mechanism and the transmission from the output driving the valve control stem and being selectively operable to free the valve stem for manual rotation without drag from the power driving mechanism or speed reducing transmission.

Yet another object of the present invention is to provide a power actuated valve in which selective operation of the valve either by power through a power drive or manually by means of a handle, wheel or the like with the power drive disconnected from the output is provided by a spring biased declutching mechanism operated by a manually engaged button positioned on or near the handle.

A still further object of the present invention is to provide the declutching mechanism with an output gear which connects to the transmission, and the output gear is decoupled from the actuator output shaft so that any drag associated with the transmission and power operating mechanism is eliminated during turning of the valve stem manually by means of the handle, lever, wheel or the like.

A further object is to provide power actuated valve control means which facilitates direct manual turning of the valve control stem by means of a handle, lever, wheel or wrench without drag from the power operating mechanism and which has a most rugged and reliable construction which is well adapted for economical manufacture.

The present invention also relates to a declutching mechanism for disengaging a valve actuator drive input from a valve, the declutching mechanism having a manual input for initiating operation of the declutching mechanism, an axially movable spring biased operating rod, a radially motivated clutch block; and a drive gear being demountably coupled to an output of the valve actuator mechanism by the radially motivated clutch block.

The present invention also relates to a method for disengaging a valve actuator drive input from a valve by use of a declutching mechanism, the method having the steps of manually initiating operation of the declutching mechanism, axially moving a spring biased operating rod, radially motivating a clutch block, and demountably coupling a drive gear to an output of the valve actuator mechanism via the radially motivated clutch block.

BRIEF DESCRIPTION OF THE DRAWINGS

The invention will now be described, by way of example, with reference to the accompanying drawings in which.

DETAILED DESCRIPTION OF THE INVENTION

Figure 1:
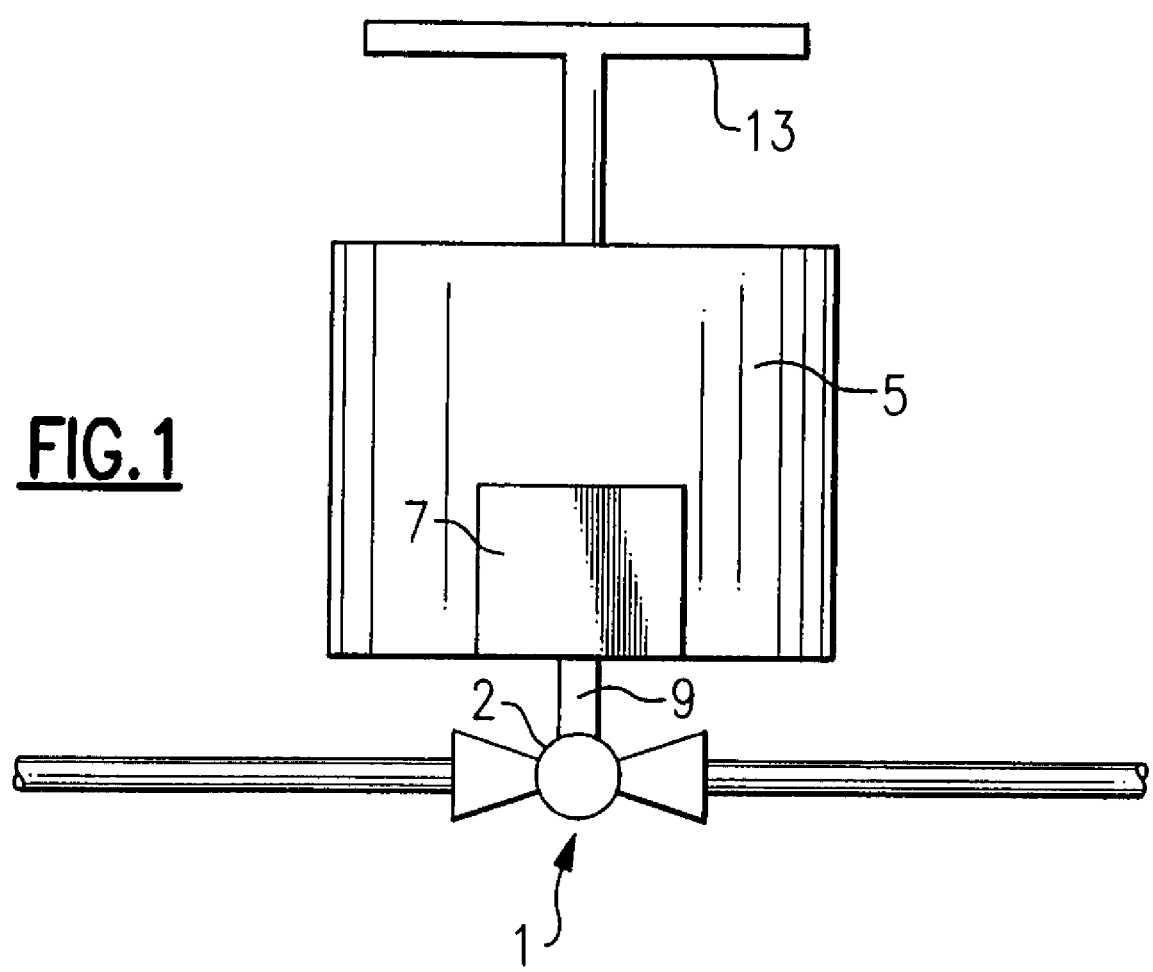
FIG. 1 is diagrammatic representation of an actuator valve.

The primary components of the manual override mechanism for an automated valve as depicted in FIG. 1 of the drawings will now be described in detail relative to the function of the automated valve. It is well known in the art to automate the opening and closing of a valve, for example a ball valve 1 via an electronic, pneumatic or hydraulically driven actuator 5 as diagrammatically shown in FIG. 1. The actuator 5 drives a reducing transmission, gear or gear train 7, also diagrammatically shown, which turns an actuator output shaft 9 connected to a ball 2 of the ball valve 1 to impart rotation thereto according to a relative signal applied to the actuator 5, e.g., a signal telling the actuator to either open or close the valve to some relative degree.

In general, because of the potential for failure of such automated systems, e.g., the loss of electric power to an electric motor driven actuator, such automated valves are very often supplied with a means of manual operation like a handle 13, wheel or even a nut for engagement by a wrench, which can be manually turned in order to turn the output shaft 9 and open and/or close the valve in the event of a power failure or failure of the actuator. As the specifics of the above noted actuators drives and types of valves which could be utilized with the below described manual override mechanism are numerous and well known in the art, no further description regarding such actuator drives and valves is provided.

Figure 2:
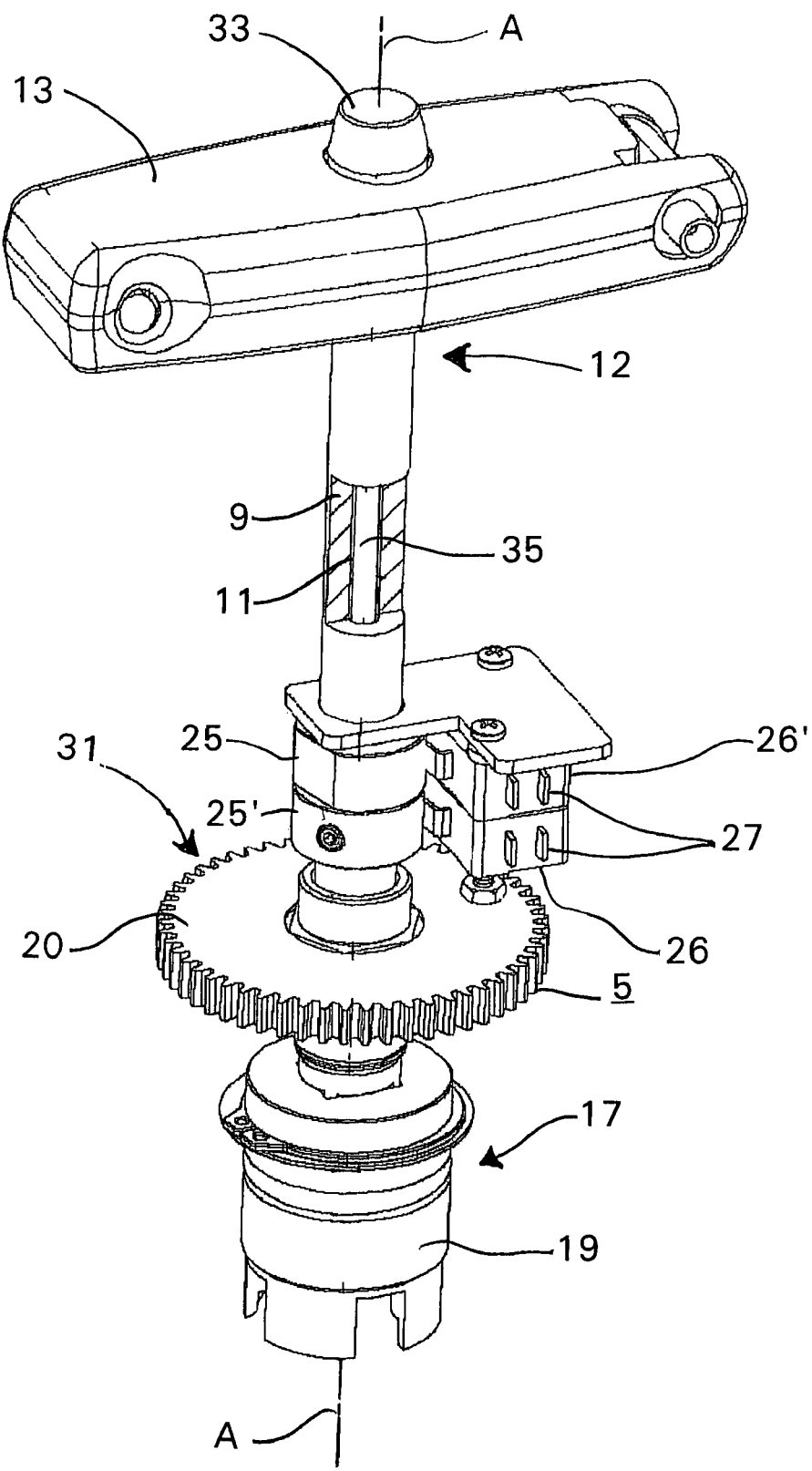
FIG. 2 is a partial view of an override mechanism of the presently claimed invention.

A description of the override or declutching mechanism of the present invention as shown in FIG. 2 is now provided. The hollow shaft 9 defines a passage 11 extending along an axis A between the handle 13 fixedly attached to a first end 12 of the shaft 9, and a second end 17 of the shaft 9 having an output coupling 19 with the valve 1 (not shown), e.g., the valve stem of the exemplary ball valve for actually rotating the ball is connected via an output coupling 19 to the second output end 17 of the shaft 9. Disengageably affixed to an intermediate portion 35' of the shaft 9 between the handle 13 and the ball valve 1, is an output gear 20 which is driven by the actuator 5 for driving rotation of the shaft 9 and hence the ball valve 1. The output gear 20 is, however, fully disengageable from rotation with the output shaft 9 through a declutching mechanism 31, to be discussed in further detail below. It is also to be appreciated that the output gear 20, associated declutching mechanism 31 and the relative connection with the actuator 5 could be positioned at any point along the shaft 9 besides that of intermediate or in-between the valve handle 13 and the output coupling 19.

Also attached to the first end 12 of the shaft 9 and positioned relative to the handle 13 is a gear train disengagement button 33. The disengagement button 33 is axially moveable along axis A relative to the shaft 9 and the handle 13 to motivate a connected override operating rod 35 which passes through the passage 11 of the hollow shaft 9 and along the axis A. When the disengagement button 33 is actuated, the operating rod 35 is moved axially along the axis A relative to the shaft 9 and operates the declutching mechanism 31 to disengage the output gear 20 from the shaft 9. A further description of the structure and function of the operating rod 35 and associated declutching mechanism 31 will be provided below.

Also attached to the shaft 9 is, for example, a limit switch operating cam 25 for defining the open and closed positions of the valve 1 via an associated electromechanical switch 26. It is to be appreciated that the switch operating cam 25 as displayed in FIG. 2 is fixedly attached so as to rotate with the shaft 9 and operate the limit electromechanical switch 26 so as to provide an electric motor 27 with a signal in accordance with the rotational position of the shaft 9. By way of example, as shown, a first cam 25 and associated switch 26 could indicate one of an open or a closed position of the valve 1, and a second cam 25' and second switch 26' could also be used to further indicate the other of the open or closed position. As other electromechanical position indicators and sensors could also be used to provide the rotational position of the valve 1 and associated components of the actuator to the motor 27, no further discussion is provided.

Figure 3:
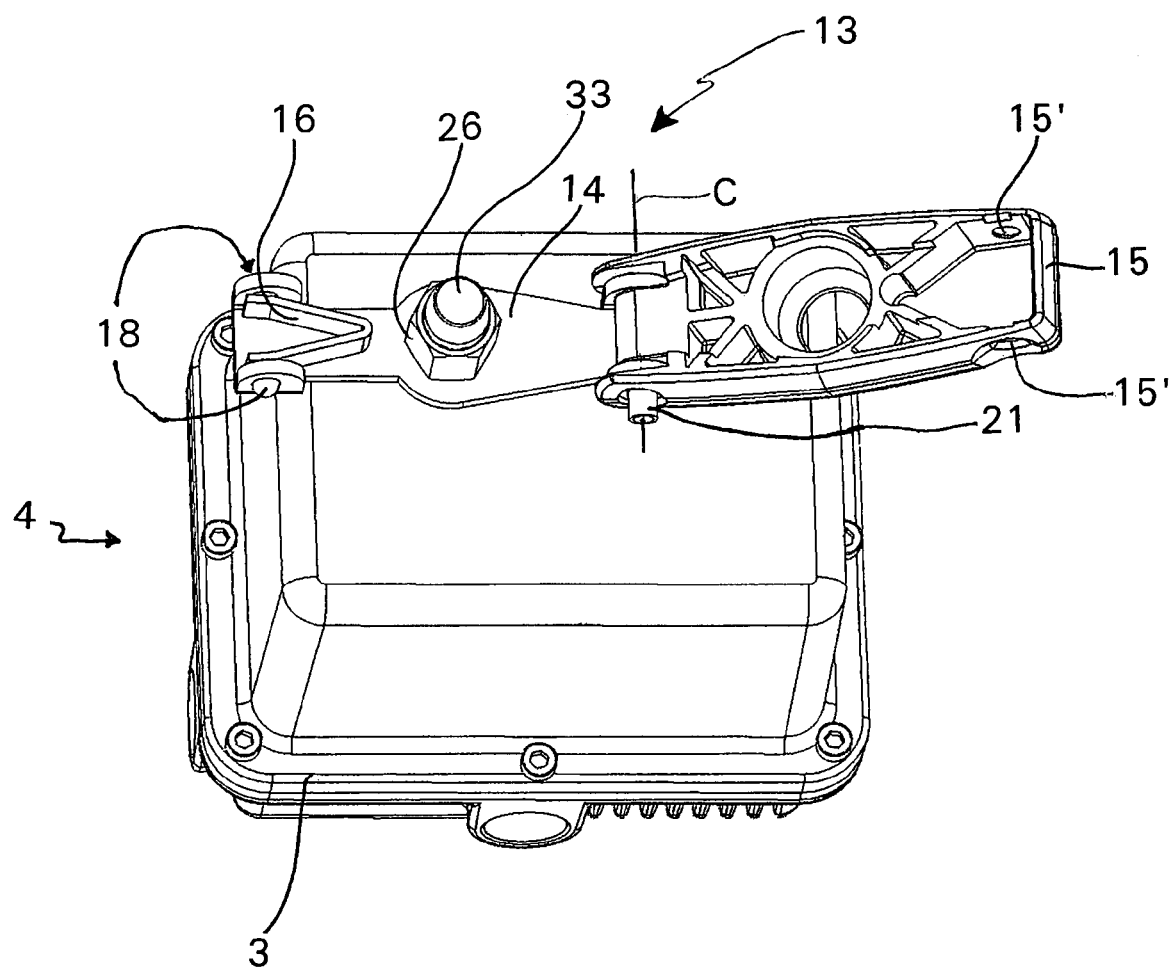
FIG. 3 is a perspective view of a handle and disengagement button.

As shown in FIG. 3, the components described above are substantially enclosed by an actuator enclosure cover 4 having a detachable base 3 secured thereto by a number of bolts as shown in FIG. 3 of the drawings. The second output end 17 of the shaft 9 connects through the base 3 with the output coupling 19 (not shown in this view), which is, in turn, connected to the ball of the ball valve 1 as described above. Extending through the top of the cover 4, the first end 12 of the shaft 9 which supports the disengagement button 33 is also connected to the manual override handle 13 for operation of the shaft 9 in conjunction with the disengagement button 33, when necessary.

The override handle 13 has a support portion 14 which is keyed in such a manner so as to be removably fixed to the shaft 9 so that rotation of the support portion 14 results is a corresponding rotation of the shaft 9. Attached to a first end of the support portion 14 is an extendable handle cover 15 which works in conjunction with the support portion 14 to make it easier for an operator to turn the shaft 9 into a desired position. The handle cover 15 is rotatably fixed to the first end of the support portion 14 so that the handle cover 15 can be rotated through about a 180 degree rotation from a closed position where the handle cover 15 is folded and substantially overlays the support portion 14 and the disengagement button 33 as shown in FIG. 2, and a second position shown in FIG. 3, where the handle cover 15 is rotated about the first end of the support portion 14 to extend substantially longitudinally with the support portion 14 and thus form a longer, extended handle 15 providing more torque for manually turning the shaft 9.

The handle cover 15 is rotatably fixed to the support portion 14 on the first end with a pin or axle 21 which allows about 180 degrees of rotation of the handle cover 15 about the pin or axle 21 along an axis C relative to the support portion 14. In the first or closed position in FIG. 2, the cover 15 is folded over the support portion 14 and secured at a free end through holes 15' by the latching engagement buttons 18 fixed to the support portion 14 via a cover release spring body 16 extending into corresponding detents or holes in both the support portion 14 as well as the free end of the cover 15.

To open the handle 13 into the extended open position the latching engagement buttons 18 are engaged by a user, the cover release spring 17 is compressed to force the buttons out of holes 15', and the free end of the cover 15 is released to be used as an extension to the support portion 14 in the open position. To again close the handle 13, the user pushes the cover 15 at the free end rotating the cover 15 about the pin or axle 21. As the cover 15 folds over the support portion 14, the edges of the cover 15 press the cover release buttons 18 inwards which, in turn, compress the cover release spring 17. When the holes 15' on the side of the cover 15 become aligned with the holes buttons 18 in the support portion 14, the cover release buttons 18 are forced through the holes 15' on the side of the cover 15 by the force of the compressed cover release spring 17, and the cover 15 is again locked into the closed position.

Figure 4:
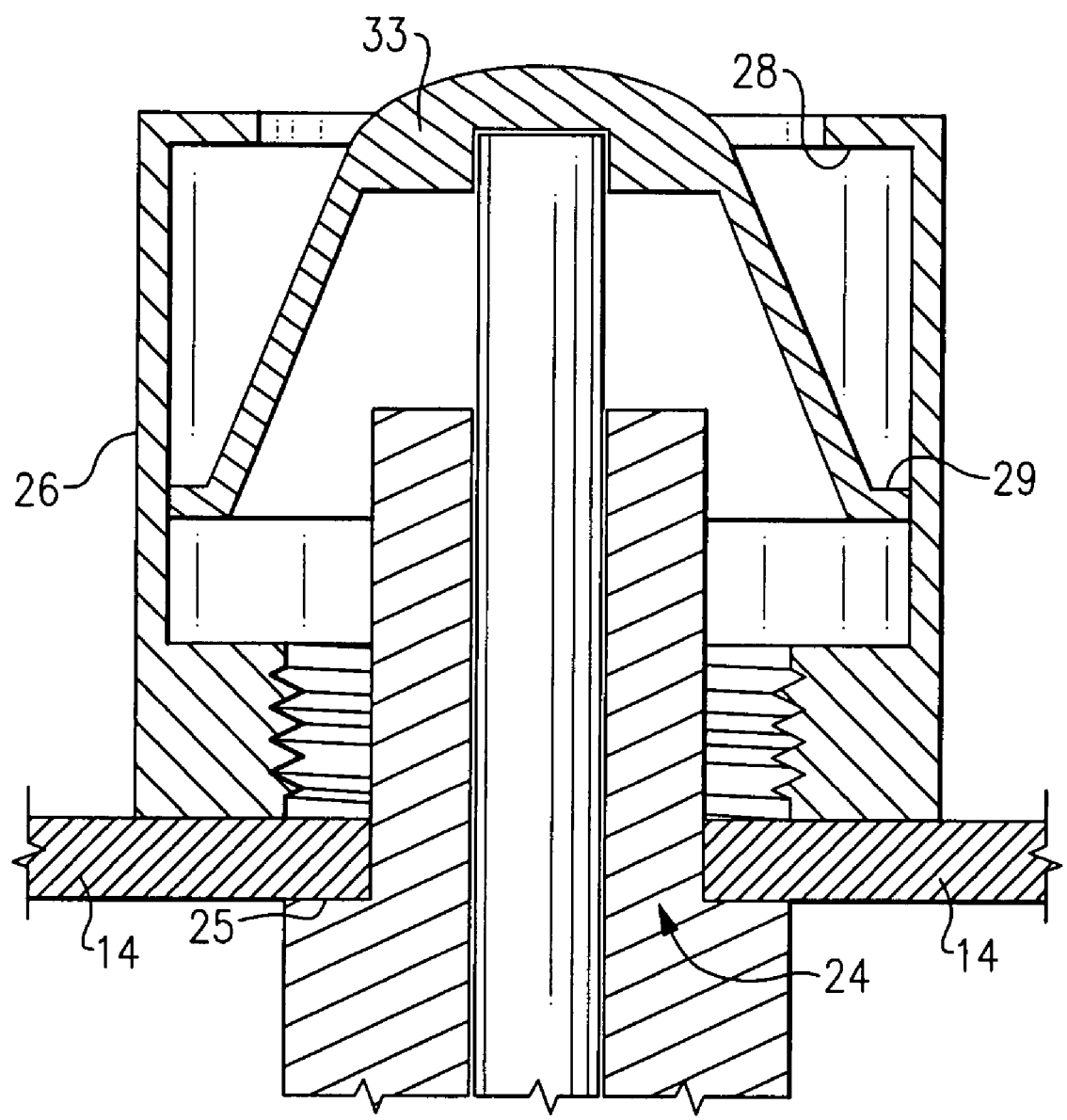
FIG. 4 is a cross section view of the handle and disengagement button.

Turning to FIG. 4, the support portion 14 of the handle 13 is attached to the shaft 9 via a keyed hole 24 with two flat sides allowing no or minimal rotation between the override handle 13 and shaft 9. Thus, as the handle 13 rotates in either a clockwise or counter-clockwise direction so does the shaft 9. A retaining nut 26 secures the support portion 14 of the override handle 13 to the shaft 9 when fastened over the override operating rod 35 and threaded to the first end of the shaft 9. When the retaining nut 26 is in place, the disengagement button 33, which is interlocked with the retaining nut 26, is in contact with the override operating rod 35. The retaining nut 26 limits the upward motion of the gear-train disengagement button 33 via an inwardly protruding edge 28 which catches an outwardly protruding edge 29 on the button 33 which, in turn, also limits the downward motion of the override operating rod 35.

Figure 5A:
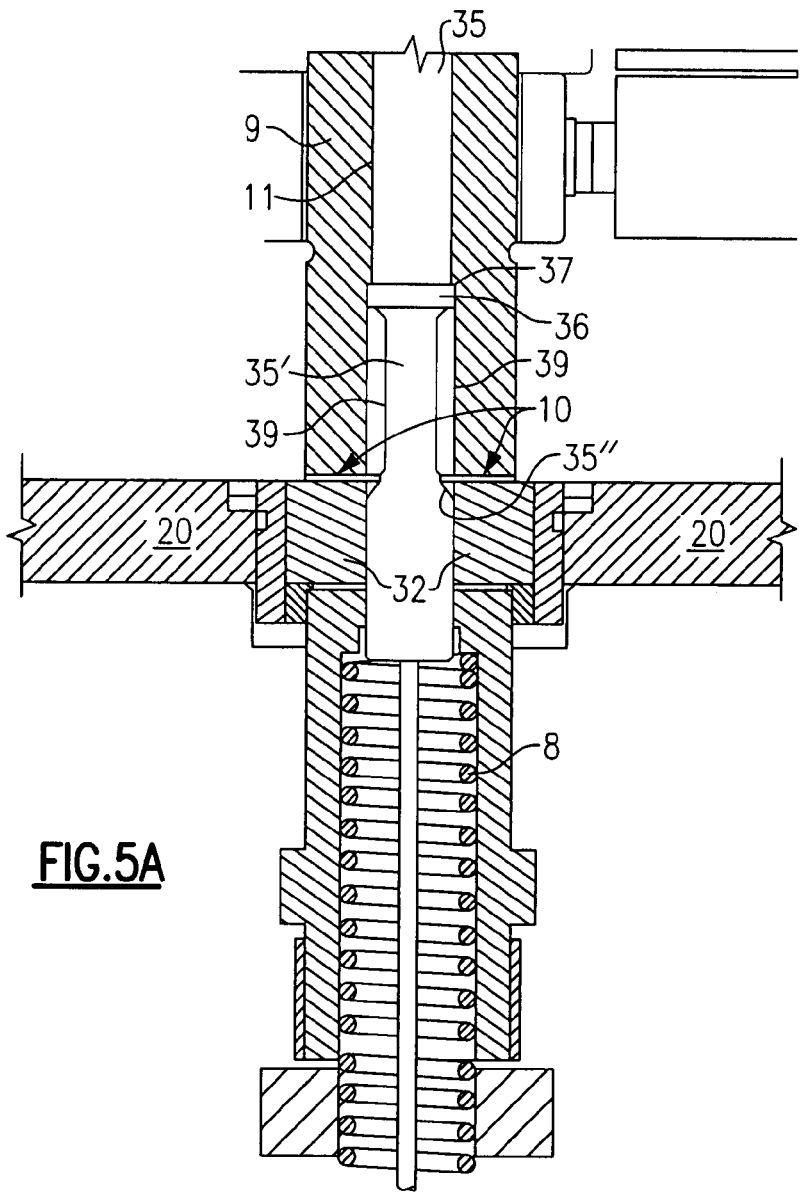
FIGS. 5a, 5b are axial and radial cross sectional views, respectively, of the declutching mechanism in an engagement position.

Turning now to FIG. 5a, at the opposing end of the operating rod 35, which extends through a passage 11 defined by the shaft 9, is an override return spring 8 biasly engaging the operating rod 35 on a bottom surface and forcing the operating rod 35, and hence the disengagement button 33, upwards relatively towards the handle 13. Approximately ¾ length down the operating rod 35, there is formed a protruding ring 36, the top edge of which limits the upward range of motion of the override operating rod 35 against a matching indentation 37 in the passage wall defined by the output shaft 9. The bottom-side of the protruding ring 36 forms a concave lip, resulting in a operating rod intermediate section 35' having a diameter or portion formed smaller than the main operating rod section 35 above the protruding ring 36. This smaller intermediate section 35' of the override operating rod 35 is essential to the manual operation of the declutching device because when the operating rod 35 is pushed down against the spring 8, a space 39 allows the cylindrical clutch dogs 32, discussed in further detail below, to move inward into the space 39 defined by intermediate section 35' releasing the connection between the shaft 9 and output gear 20. Below the intermediate section 35', a slope section changes the smaller intermediate section 35' back to a larger diameter.

The shaft 9 encompassing the operating rod 35 is a hollow shaft which extends the entire length of the device from the handle 13 to the output coupling 19 and transfers the rotational force, either from the motor 27 or the override handle 13 to the output coupling 19. The hollow shaft 9 defines the passage 11 in which the operating rod 35 is axially biased. At the location on the shaft 9 where the output gear 20 is located, there are two small radial passages or holes 10 formed on opposite sides of the shaft 9. A pair of cylindrical clutch dogs 32, one for each radial passage or hole 10 and loosely positioned for radial movement relative to the shaft 9 and operating rod 35 are incorporated therewith. The radial position of the clutch dogs 32 depends on the position of the override operating rod 35 as will be discussed in greater detail below Turning now to FIG. 5b, the output gear 20 is the last gear in the gear train 7 (not shown) driven by, for example, the electric motor 27 to drive the normal, i.e., electromechanical, opening and closing operations of the valve 1. The clutch dogs 32, the passages 10 and the output gear 20 are all part of the declutching mechanism 31 for engaging and disengaging the output gear 20 from the output shaft 9. The output gear 20 has an inner bore 22 having a pair of opposing notches 23 depicted in FIGS. 5-7 which may be further defined by a hardened bore ring 30 including the pair of opposing notches 23. The declutching mechanism 31 connects the output gear 20 to the shaft 9 when the cylindrical clutch dogs 32 are pushed through the respective radial passages 10 in the output shaft 9 by the operating rod 35 and interlocked in the notches of the output gear 20 as shown in FIGS. 5a, 5b.

Figure 6A:
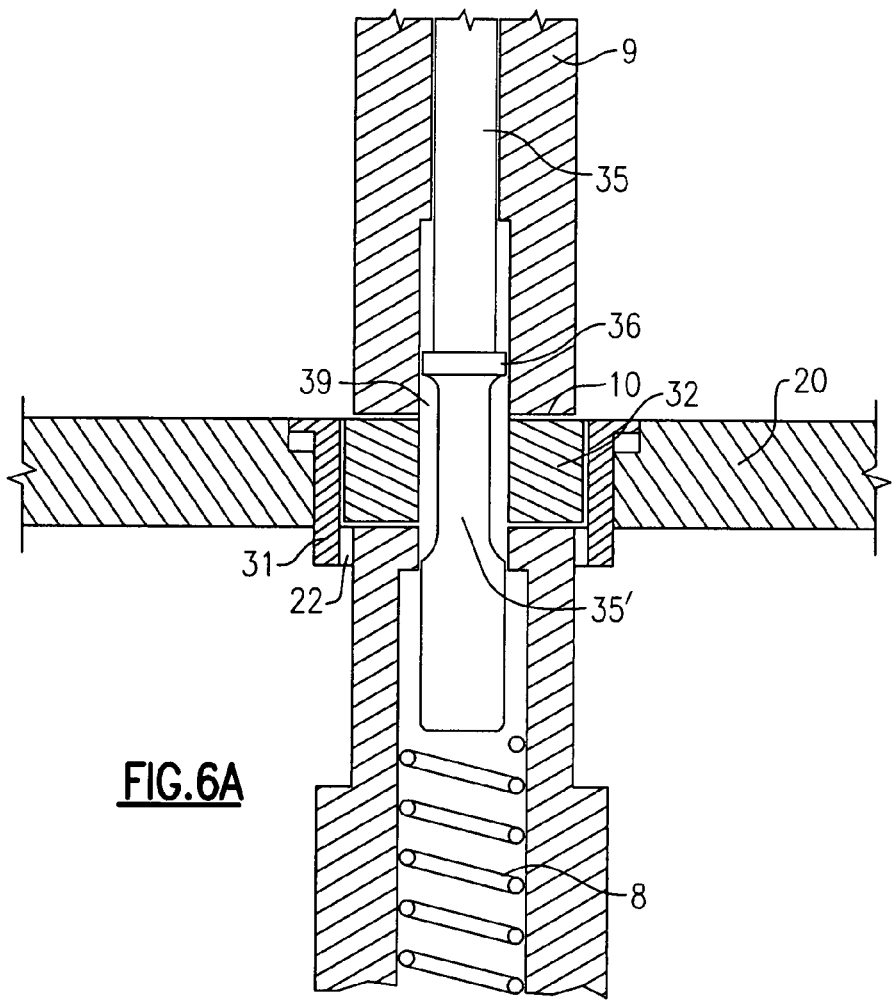
FIGS. 6a, 6b are axial and radial cross sectional views, respectively, of the declutching mechanism in a disengaged position.
Figure 6B:
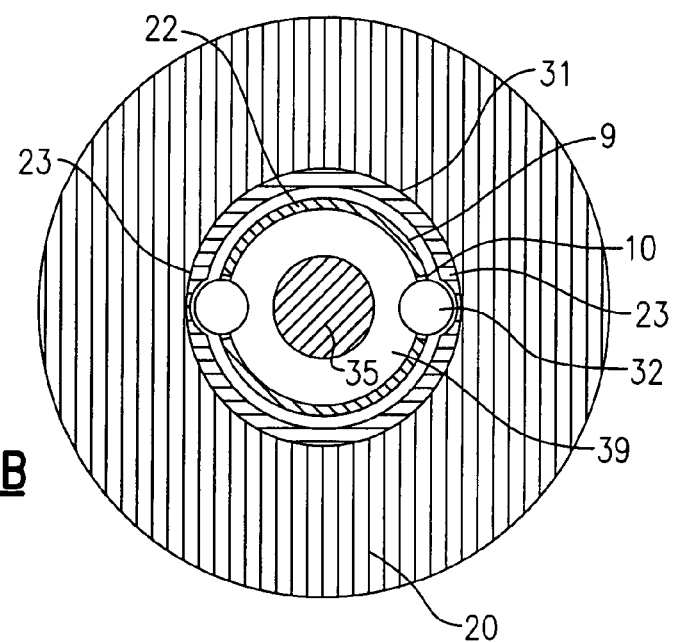

To disconnect the output gear 20 from the output shaft 9 to facilitate manual operation of the valve, the disengagement button 33 is pushed, thus also pushing the operating rod 35 downwards against the bias of spring 8 and, as seen in FIGS. 6a and 6b, the sufficient space 39 is created in the passage 11 between the smaller diameter intermediate section of the operating rod 35 and the inner wall of the output shaft 9 to permit the clutch dogs 32 to be retracted therein. Thus, when the shaft 9 is rotated by an operator with the disengagement button 33 pushed, the output gear 20 is generally held back from correspondingly turning by the inherent drag of the actuator 5 and the gear train 7 and the corners of the notches 23 in the bore 21 the output gear 20 place an inward axial force on the cylindrical clutch dogs 32 forcing the clutch dogs 32 inward into the space 39 in the passage 11 of the output shaft 9. Thus, with the clutch dogs 32 retracted, as shown in FIG. 8, the declutching mechanism 31 disengages the output gear 20 from the shaft 9 by pushing the cylindrical clutch dogs 32 into the radial passages 10 in the output shaft 9 when the gear train disengagement button 33 is pressed, and hence the output shaft 9 is free to rotate relative to the output gear 20.

Figure 5B:
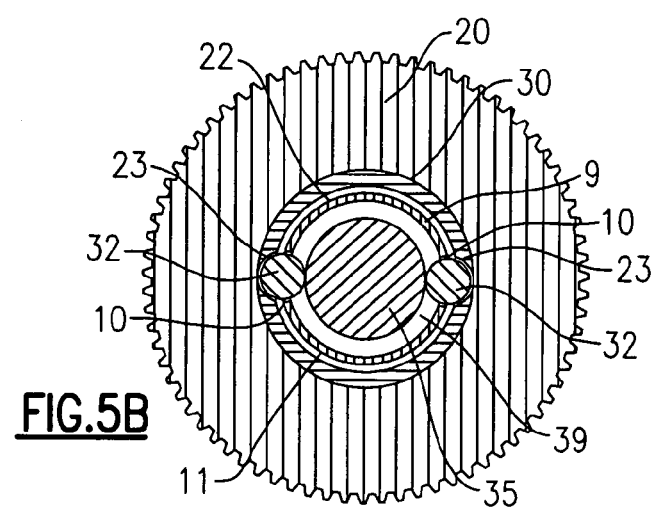

As shown in FIGS. 5a, 5b of the drawings, when the output gear 20 is engaged (i.e., the gear train disengagement button 33 is not pressed), the cylindrical clutch dogs 32 are locked into the notches 23 of the declutching mechanism 31 and through the passages or holes 10 in the output shaft 9 by the override operating rod 35 in the center of the shaft 9. In this position, the cylindrical clutch dogs 32 allow minimal slip between the output gear 20 and the shaft 9 and, therefore, allow the actuator 5 or any other device supplying rotational energy to the output gear 20 to control the rotation of the shaft 9.

When the disengagement button 33 is engaged or pressed, as depicted in FIGS. 6a, 6b, the override operating rod 35 compresses the override return spring 8 and the smaller diameter intermediate section 35' of the override operating rod 35 is motivated into position next to the clutch dogs 32. In this position, the cylindrical clutch dogs 32 are no longer locked into the notches 23 in the output gear and are free to move inwardly into the space 39.

Figure 7A:
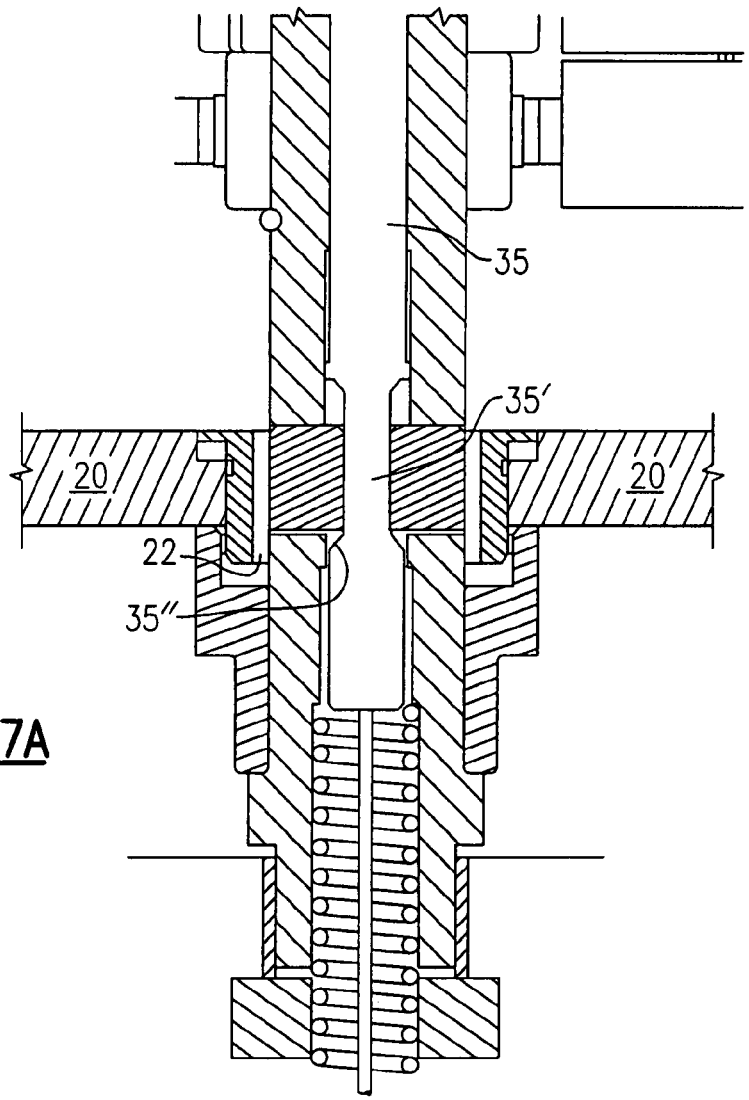
FIGS. 7a, 7b are axial and radial cross sectional views, respectively, of the declutching mechanism in a disengaged position.
Figure 7B:
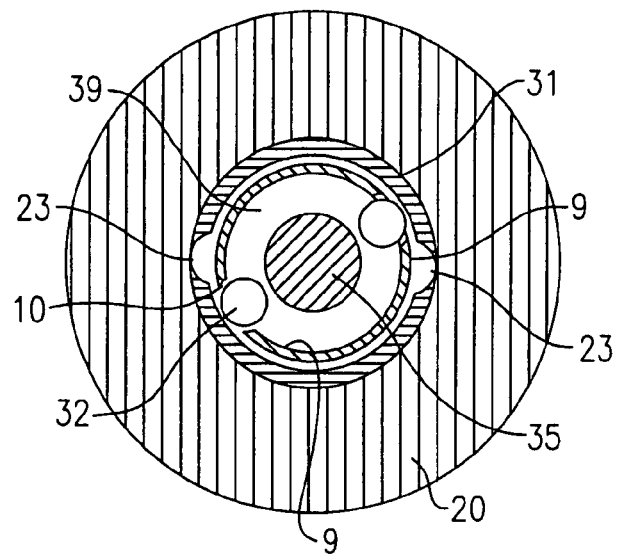

As shown in FIGS. 7a, 7b, when the override handle 13 is rotated slightly while the disengagement button 33 is pressed, the output shaft 9 turns and the notches 23 of the output gear 20 push the clutch dogs 32 back through the holes 10 in the output shaft 9 and thus free the shaft 9 from the output gear 20. Once the clutch dogs 32 have been pushed from the notches 23, the gear train disengagement button 33 need no longer be pressed to operate the valve manually. The override handle 13 and output shaft 9 will rotate up to 180 degrees about the axis A in either the clockwise or counter-clockwise direction while opening and closing the ball valve 1 without any interference from the output gear 20, gear train 7, or drive motor 27.

While the override handle 13 is rotating, the upward force created by the override return spring 8 is partially converted into an axial force by the angled slope 35″ of the override operating rod 35. This axial force placed on the bottom edge of the cylindrical clutch dogs 32 causes them to rotate along the inner wall of the shaft 9 acting almost like a bearing. Once the override handle 13 has rotated 180 degrees, the holes 10 in the output shaft 9 become realigned with the opposite notches 23 in the output gear 20. If the disengagement button 33 is not again pressed, the clutch dogs 32 are forced into the notches 23 by the upward force that the override return spring 8 places on the override operating rod 35. Once the cylindrical clutch dogs 32 are forced into the notches 23 of the declutching mechanism 31, the override return spring 8 forces the operating rod 35 upwards and the output gear 20 becomes re-engaged with the output shaft 9 and can again control its rotation.

Since certain changes may be made in the above described declutching mechanism, without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A declutching mechanism for disengaging a valve actuator drive input from a valve, the declutching mechanism comprising:
    a manual input for initiating operation of the declutching mechanism;
    an axially movable spring biased operating rod;
    a radially motivated clutch block;
    a drive gear being demountably coupled to an output of the valve actuator mechanism by the radially motivated clutch block; and
    wherein the spring biased operating rod is provided with a clutch block motivating portion and a clutch block releasing portion having a smaller diameter than the motivating portion.

2. The declutching mechanism as set forth in claim 1 further comprising an engagement position wherein the spring biased operating rod radially motivates the clutch block into engagement with the drive gear to rotatably secure the drive gear to the output of the valve actuator mechanism.

3. The declutching mechanism as set forth in claim 2 further comprising a disengaged position wherein the spring biased operating rod is axially moved to permit the clutch block to be radially motivated out of engagement with the drive gear to rotatably detach the drive gear from the output of the valve actuator mechanism.

4. The declutching mechanism as set forth in claim 1 further comprising a first position wherein the motivating portion of the operating rod radially forces the clutch block into engagement with the drive gear to rotatably secure the drive gear to the output of the valve actuator mechanism.

5. The declutching mechanism as set forth in claim 1 further comprising a second position wherein the releasing portion of the operating rod permits the clutch block to radially disengage with the drive gear and rotatably release the drive gear from rotation with the output of the valve actuator.

6. The declutching mechanism as set forth in claim 5 wherein the manual input for initiating the declutching mechanism influences the operating rod to move axially between the first position and the second position relative to the drive gear.

7. A method for disengaging a valve actuator drive input from a valve by use of a declutching mechanism, the method comprising the steps of:
    manually initiating operation of the declutching mechanism;
    axially moving a spring biased operating rod;
    radially motivating a clutch block;
    demountably coupling a drive gear to an output of the valve actuator mechanism via the radially motivated clutch block; and
    forming on the spring biased operating rod a clutch block motivating portion and a clutch block releasing portion, the releasing portion having a reduced cross-section than the motivating portion.

8. The method for disengaging a valve actuator drive input from a valve by use of a declutching mechanism as set forth in claim 7 further comprising the step of radially motivating the clutch block via the operating rod into an engagement position with the drive gear to rotatably secure the drive gear to the output of the valve actuator mechanism.

9. The method for disengaging a valve actuator drive input from a valve by use of a declutching mechanism as set forth in claim 8 further comprising the step of axially moving the spring biased operating rod to a disengaged position to permit the clutch block to be radially motivated out of engagement with the drive gear to rotatably detach the drive gear from the output of the valve actuator mechanism.

10. The method for disengaging a valve actuator drive input from a valve by use of a declutching mechanism as set forth in claim 7 further comprising the step of defining a first position wherein the motivating portion of the operating rod radially forces the clutch block into engagement with the drive gear to rotatably secure the drive gear to the output of the valve actuator mechanism.

11. The method for disengaging a valve actuator drive input from a valve by use of a declutching mechanism as set forth in claim 10 further comprising the step of defining a second position wherein the releasing portion of the operating rod permits the clutch block to radially disengage with the drive gear and rotatably release the drive gear from rotation with the output of the valve actuator.

12. The method for disengaging a valve actuator drive input from a valve by use of a declutching mechanism as set forth in claim 11 further comprising the step of initiating the declutching mechanism to influence the operating rod to move axially between the first position and the second position relative to the drive gear.

* * * * *